United States Patent
Crean

(10) Patent No.: US 6,623,058 B1
(45) Date of Patent: Sep. 23, 2003

(54) SECURING MECHANISM FOR RECREATIONAL VEHICLE SLIDE OUTS

(75) Inventor: Johnnie R. Crean, Chino, CA (US)

(73) Assignee: Alfa Leisure, Inc., Ontario, CA (US)

( * ) Notice: Subject to any disclaimer, the term of this patent is extended or adjusted under 35 U.S.C. 154(b) by 0 days.

(21) Appl. No.: 09/949,013

(22) Filed: Sep. 6, 2001

Related U.S. Application Data
(60) Provisional application No. 60/230,600, filed on Sep. 6, 2000.

(51) Int. Cl.⁷ .................................................. B62C 1/06
(52) U.S. Cl. ...................... 296/26.13; 296/165; 296/171; 296/175
(58) Field of Search ........................... 296/26.13, 26.12, 296/26.01, 165, 171, 175; 52/67

(56) References Cited

U.S. PATENT DOCUMENTS

| | | |
|---|---|---|
| 1,536,518 A | 5/1925 | Osborn |
| 2,150,615 A | 3/1939 | Sword |
| 2,177,394 A | 10/1939 | Pierce |
| 2,225,319 A | 12/1940 | Rollo |
| 2,606,057 A | 8/1952 | Johnson |
| 2,639,187 A | 5/1953 | Grumbache .................. 296/37.6 |
| 2,704,223 A | 3/1955 | Houdart |
| 2,788,791 A | 4/1957 | Pospisil et al. |
| 2,876,035 A | 3/1959 | Houdart |
| 3,106,750 A | 10/1963 | Jarman |
| 3,165,350 A | 1/1965 | Willson |
| 3,254,914 A | 6/1966 | Steck |
| 3,287,058 A | 11/1966 | Wells |
| 3,300,839 A | 1/1967 | Lichti |
| 3,341,986 A | 9/1967 | Brosig |
| 3,565,480 A | 2/1971 | McCollum et al. |
| 3,572,809 A | 3/1971 | Buland ........................ 296/23 |
| 3,608,954 A | 9/1971 | Lynd ........................... 296/23 |
| 3,719,386 A | 3/1973 | Puckett et al. |
| 3,735,998 A | 5/1973 | Green ..................... 280/106 T |
| 3,740,088 A | 6/1973 | Ratcliff ..................... 296/23 C |
| 3,801,138 A | 4/1974 | Quick ..................... 280/478 R |

(List continued on next page.)

FOREIGN PATENT DOCUMENTS

| | | |
|---|---|---|
| CH | 353262 | 9/1957 |
| DE | 42 04 640 A | 8/1993 |
| GB | 616274 | 1/1949 |
| GB | 2088789 | 11/1980 |
| GB | 2 260 951 | 5/1993 |
| IT | 478931 | 5/1951 |

OTHER PUBLICATIONS

Carefre, the World's Greatest Selection of RV Awnings, Sidewinder II, vol. 8, Issue 1, p. 19, 1997.
Brochure: Ideal from Alfa, 11/96.

*Primary Examiner*—D. Glenn Dayoan
*Assistant Examiner*—Lori L Coletta
(74) *Attorney, Agent, or Firm*—Knobbe, Martens, Olson & Bear, LLP

(57) ABSTRACT

A securing mechanism for use with a recreational vehicle (RV) slide out assembly. The securing mechanism structurally interconnects the slide out assembly to the RV when the slide out assembly is in a retracted position and when it is in an extended position. Specifically, loads in the RV induced from the road, from passengers, from equipment, and other various sources are distributed through the slide out assembly. Advantageously, flexure of the RV walls around the slide out opening is reduced. As a result, walls and their fixtures are less likely to be damaged due to flexure, seals between the RV walls and the slide out are more likely to stay intact, and the size of slide outs can be increased without compromising the structural integrity of the RV.

18 Claims, 8 Drawing Sheets

U.S. PATENT DOCUMENTS

| | | | | |
|---|---|---|---|---|
| 3,825,281 | A | 7/1974 | Howard | 280/423 R |
| 3,850,470 | A | 11/1974 | Trelle | 296/23 C |
| 3,887,220 | A | 6/1975 | Hall | 280/423 R |
| 3,895,726 | A | 7/1975 | Rassieur | 214/83.24 |
| 3,902,752 | A | 9/1975 | Pelletier | 296/91 |
| 3,915,492 | A | 10/1975 | Agnese | 296/23 C |
| 3,918,510 | A | 11/1975 | Hayward | 160/45 |
| 3,959,985 | A | 6/1976 | Schulze, Sr. | 62/239 |
| 4,014,586 | A | 3/1977 | Swofford | 296/23 A |
| 4,106,732 | A | 8/1978 | Whiting | 296/23 C |
| 4,108,326 | A | 8/1978 | Bertolini | 220/1.5 |
| 4,109,954 | A | 8/1978 | Wall | 296/23 A |
| 4,147,379 | A | 4/1979 | Winslow | 280/781 |
| 4,175,576 | A | 11/1979 | Iby | 135/1 A |
| 4,322,108 | A | 3/1982 | McPherson | 296/164 |
| 4,457,554 | A | 7/1984 | Fuisz et al. | 296/179 |
| 4,468,823 | A | 9/1984 | Tounjian | 5/417 |
| 4,480,866 | A | 11/1984 | Komatsu | 296/21 |
| 4,500,132 | A | 2/1985 | Yoder | 296/171 |
| 4,550,946 | A | 11/1985 | Hanemaayer | 296/156 |
| 4,589,463 | A | 5/1986 | Ryan | 160/88 |
| RE32,262 | E | 10/1986 | Stewart | 296/171 |
| 4,652,041 | A | 3/1987 | Barber et al. | 296/171 |
| 4,653,125 | A | 3/1987 | Porter | 4/301 |
| 4,719,954 | A | 1/1988 | Curtis et al. | 160/67 |
| 4,728,144 | A | 3/1988 | Crean | 296/168 |
| 4,729,594 | A | 3/1988 | Hoff | 296/161 |
| 4,746,164 | A | 5/1988 | Crean | 296/164 |
| 4,772,063 | A | 9/1988 | Amy | 296/371 |
| 4,776,631 | A | 10/1988 | Sargent et al. | 296/156 |
| 4,841,897 | A | 6/1989 | Claflin | 114/270 |
| 4,867,502 | A | 9/1989 | Sylvester et al. | 296/161 |
| 4,955,661 | A | 9/1990 | Mattice | 296/171 |
| 4,957,323 | A | 9/1990 | Johnson | 296/181 |
| 4,960,299 | A | 10/1990 | Steadman | 296/26 |
| 4,971,355 | A | 11/1990 | Studdard | 280/789 |
| 4,974,899 | A | 12/1990 | Sargent | 296/156 |
| 5,028,072 | A | 7/1991 | Lindsay | 280/789 |
| 5,061,001 | A | 10/1991 | Madden et al. | 296/26 |
| 5,090,749 | A | 2/1992 | Lee | 296/171 |
| 5,100,196 | A | 3/1992 | Dodgen | 296/156 |
| 5,100,716 | A | 3/1992 | Juneau | 428/167 |
| 5,112,082 | A | 5/1992 | Clelland | 280/783 |
| 5,143,418 | A | 9/1992 | Fouquet | 296/182 |
| 5,171,056 | A | 12/1992 | Faludy et al. | 296/163 |
| 5,199,120 | A | 4/1993 | Holmes | 5/419 |
| 5,237,782 | A | 8/1993 | Cooper | 52/67 |
| 5,242,185 | A | 9/1993 | Carr et al. | 280/423.1 |
| 5,248,005 | A | 9/1993 | Mochizuki | 175/85 |
| 5,280,990 | A | 1/1994 | Rinard | 296/180.1 |
| 5,291,701 | A | 3/1994 | Delacollette et al. | 52/67 |
| 5,358,298 | A | 10/1994 | Fate | 296/26 |
| 5,374,094 | A | 12/1994 | Smith et al. | 296/26 |
| 5,401,050 | A | 3/1995 | Baker | 280/656 |
| 5,403,063 | A | 4/1995 | Sjostedt et al. | 296/187 |
| 5,419,607 | A | 5/1995 | Oliveira | 296/159 |
| 5,516,182 | A | 5/1996 | Aragon et al. | 296/100 |
| 5,529,825 | A | 6/1996 | Sutherland | 428/88 |
| 5,560,444 | A | 10/1996 | Tiedge | 180/209 |
| 5,566,918 | A | 10/1996 | Becker | 248/351 |
| 5,620,224 | A | 4/1997 | DiBiagio et al. | 296/26 |
| 5,634,683 | A | 6/1997 | Young | 296/165 |
| 5,658,031 | A | 8/1997 | DiBiagio et al. | 296/26 |
| 5,658,032 | A | 8/1997 | Gardner | 296/26 |
| 5,673,962 | A | 10/1997 | Maieli et al. | 296/164 |
| 5,706,616 | A | 1/1998 | Fernandez | 52/143 |
| 5,718,253 | A | 2/1998 | McNamee | 135/88.13 |
| 5,734,336 | A | 3/1998 | Smithline | 340/903 |
| 5,746,473 | A | 5/1998 | Crean | 296/181 |
| 5,785,373 | A | * 7/1998 | Futrell et al. | 296/165 |
| 5,788,306 | A | 8/1998 | DiBiagio et al. | 296/26.02 |
| 5,791,715 | A | 8/1998 | Nebel | 296/26 |
| 5,791,726 | A | 8/1998 | Kaufman | 296/181 |
| 5,800,002 | A | 9/1998 | Tiedge et al. | 296/26 |
| 5,833,294 | A | 11/1998 | Williams et al. | 296/24.1 |
| 5,894,698 | A | 4/1999 | Dewald, Jr. et al. | 52/67 |
| 5,902,001 | A | 5/1999 | Schneider | 296/26.13 |
| 5,915,774 | A | 6/1999 | Tiedge | 296/26.13 |
| 5,934,026 | A | 8/1999 | Green | 52/143 |
| 5,940,012 | A | 8/1999 | Studebaker | 340/932.2 |
| 5,951,082 | A | 9/1999 | DiBiagio et al. | 296/26.13 |
| 5,983,576 | A | 11/1999 | Hanser et al. | 52/67 |
| 6,007,142 | A | 12/1999 | Gehman et al. | 296/171 |
| 6,048,016 | A | * 4/2000 | Futrell et al. | 296/165 |
| 6,098,346 | A | 8/2000 | Miller et al. | 52/67 |
| 6,158,794 | A | 12/2000 | Flanagan | 296/376 |
| 6,170,903 | B1 | 1/2001 | Crean | 296/168 |
| 6,224,126 | B1 * | 5/2001 | Martin et al. | 296/165 |
| 6,227,607 | B1 * | 5/2001 | Dewald et al. | 296/165 |
| 6,231,115 | B1 | 5/2001 | Crean | 296/182 |
| 6,257,638 | B1 * | 7/2001 | Graber | 296/26.01 |
| 6,260,909 | B1 | 7/2001 | Crean et al. | 296/163 |
| RE37,351 | E | 9/2001 | Crean | 296/181 |
| 6,293,612 | B1 | 9/2001 | Crean | 296/175 |

* cited by examiner

SECURING MECHANISM FOR RECREATIONAL VEHICLE SLIDE OUTS

RELATED APPLICATIONS

This application claims the benefit of U.S. Provisional Patent No. 60/230,600 which was filed on Sep. 6, 2000. This application hereby incorporates the above application by reference.

BACKGROUND OF THE INVENTION

1. Field of the Invention

The present invention relates to recreational vehicles and, in particular, relates to motor homes and travel trailers that are adapted to expand in size so as to increase the effective interior living space of the vehicle.

2. Description of the Related Art

Recreational vehicles (RVs) have become an increasingly popular and common means of recreation. RVs are vehicles that include a living space inside and can be either self-propelled as in a motorhome or can depend on another vehicle for their motive power as in campers or trailers.

A typical RV comprises a chassis and a frame upon which coach bodywork is mounted. The coach bodywork, which provides and encloses the living space of the RV, typically comprises a floor and vertical walls that extend upwards from the floor. A roof usually rests on and depends on the vertical walls of the body for structural support.

Inside the coach body, RVs typically provide sleeping areas, cooking facilities, and self-contained water supplies and toilet facilities. More elaborate RVs can include refrigerator/freezer units, showers and/or bathtubs, air conditioning, heaters, built in generators and/or power inverters, televisions, VCRs, and clothes washer and dryers. RVs provide many of the amenities of a residential home while on the road away from home and are popular for this reason.

RV users will typically use the RV to travel to a recreational area and live in the RV for some period of time. RV users often have families with children and, as their trips are often of a recreational nature, will often invite friends or family along on the trip. Some people even use a RV as their primary residence.

It can be understood that since a RV will often be used by a large number of people and often for an extended period of time, the RV manufacturers and customers will seek to maximize the amount of usable living space inside their RVs. However, vehicle codes restrict the maximum width and length of vehicles that may be driven on public roads. Also, as a vehicle increases in size, it might become difficult to drive or even become too large to fit into desired destinations. In addition, as the RV gets physically larger, more fuel is required to move it, which increases the cost of operation.

One feature that RV manufacturers have used to increase available living space in RVs without increasing the overall vehicle size is the incorporation of slide outs. Slide outs are movable sections of the RV that can extend outward from the RV coach body and effectively increase the interior floor space. Slide outs typically have rigid walls on three sides as well as a rigid roof and floor. The fourth wall space is open to the interior of the RV to provide access between the interiors of the slide out and the RV.

Slide outs typically have two normal positions of use: the live-in and the travel position. When the RV reaches its destination and comes to rest, the slide out can be extended to its live-in position. By extending the slide out to the live-in position, the footprint of the RV is increased along with the available interior floor space. When the user wants to move the RV, the slide out is retracted to the travel position. In the travel position, the outer wall of the slide out typically lies flush with the outer walls of the RV coach and the slide out is secured in some manner to allow the RV to travel.

Designers of the RV preferably take into account the loading that the RV will undergo when designing the slide out. For example, the RV body will likely undergo static loading due to the weight of the passengers and cargo, and the RV body will likely undergo dynamic loading due to forces induced by the various driving surfaces over which the RV drives.

As stated, an opening must be provided in the wall of the RV body to accommodate the slide out. As a result, structural support is lost from the RV body at the opening and the stiffness and strength of the RV body is degraded. It will be understood that as the slide out gets larger and the size of the opening in the side of the RV increases, the stiffness and strength of the RV body become further degraded.

More specifically, as the recreational vehicle is travelling down the road, vibrations and other mechanical forces are transmitted to the walls via the wheels. At the opening for the slide out, portions of the wall are not connected to each other which results in these portions having a greater tendency to move with respect to each other. For example, the bottom of the RV wall below the opening is likely to flex with respect to the top of the RV wall above the opening because structurally supportive material has been removed to make the opening. Similarly, the RV wall on one side of the opening is likely to flex with respect to the RV wall on the other side of the opening because structurally supportive material has been removed to make the opening. Over time, these movements may result in damage to the walls of the recreational vehicle. For example, there are often cabinets, surface treatments and fixtures mounted on interior surfaces of the walls. If these items are mounted on the interior surface immediately adjacent the slide out opening, these items may ultimately work loose from the wall presenting a less pleasing appearance.

Moreover, excessive flexing of the walls of the recreational vehicle with respect to the slide out opening can cause the walls of the RV to come into contact with the walls of the slide out. This may result in deformation of the interface between the walls and the slide out member. This deformation may further result in the slide out no longer sealing with respect to the main housing of the recreational vehicle or can further inhibit unimpeded motion of the slide out between the deployed and retracted configuration.

On a related note, the unsupported sections of the RV walls may vibrate against the walls of the slide out and thereby create audible noise. Disadvantageously, this vibratory noise may create an annoyance for the RV users when travelling.

These problems have resulted in recreational vehicle manufacturers limiting the size of the slide out openings in the side walls of the recreational vehicle. As such, the slide outs themselves are also being limited both in terms of their height and their length. It will be appreciated that slide outs generally have a lower ceiling height than the main housing of the recreational vehicle due to the floor and ceiling of the slide out being inset from the floor and ceiling of the main housing. The loss of structural reinforcement as a result of the slide out opening further induces recreational vehicle manufacturers to further reduce the height of the opening so as to reduce the loss of structural reinforcement. This further reduces the height of the slide out area, thereby limiting its use and comfort when in the deployed configuration.

Moreover, the length of the slide out opening is also often limited to limit the loss of structural support along the side wall of the recreational vehicle. This reduces the overall floor area of the slide out and thus the overall available living space of the recreational vehicle when the slide out is in the deployed configuration.

From the foregoing, it is apparent that there is a need for a recreational vehicle having a slide out that allows for greater dimensioned slide outs. To this end, there is a need for a slide out assembly that can be expanded both in length and in height without a significant loss of structural support in the main housing so that the potential for damage or loss of integrity of the recreational vehicle housing when the slide out is in the retracted position during travel is reduced.

SUMMARY OF THE INVENTION

The aforementioned needs are satisfied by the recreational vehicle of the present invention with the reinforced slide out mechanism. In one aspect, the present invention is a recreational vehicle comprising a chassis having a first and second end and a first and a second lateral side, a set of wheels attached to the chassis to permit rolling movement over the ground, and a main housing. The main housing has a floor positioned on the chassis, a first side wall and a second side wall and a first side wall and a second end wall and a roof mounted atop the first side wall, the second side wall, the first end wall, and the second end wall so as to define an interior living space. The first side wall defines an opening therein that extends a first lateral distance in the first side wall and a first vertical distance such that the opening in the first side wall defines an upper portion and a lower portion of the first side wall.

The recreational vehicle further comprises a slide out housing that is mounted in the opening in the first side wall, and the slide out housing is movable between a retracted position and an extended position. When in the retracted position, the slide out housing is retracted into the opening so as to be substantially positioned within the main housing. When in the extended position, the slide out housing is extended outward from the opening so that a portion of the slide out housing is extended outward from the first side wall. Furthermore, the recreational vehicle comprises a securing mechanism that engages with the slide out housing and the upper portion and the lower portion of the first side wall such that the securing mechanism, in combination with the slide out housing, inhibits movement between the upper portion of the first side wall and the lower portion of the first side wall of the main housing when the slide out housing is in the retracted position. The securing mechanism engages with the slide out housing and the upper portion and the lower portion of the first side wall such that the securing mechanism, in combination with the slide out housing, inhibits movement between the upper portion of the first side wall and the lower portion of the first side wall of the main housing when the slide out housing in the extended position.

In another aspect, the present invention is a recreational vehicle comprising a chassis having a first end and a second end and a first lateral side and a second lateral side, a set of wheels attached to the chassis to permit rolling movement over the ground, and a main housing. The main housing has a floor positioned on the chassis, a first side wall and a second side wall and a first end wall and a second end wall and a roof mounted atop the first side wall, the second side wall, the first end wall, and the second end wall so as to define an interior living space. The first side wall defines an opening therein that extends a first lateral distance in the first side wall and a first vertical distance such that the opening in the first side wall defines an upper portion and a lower portion of the first side wall.

The recreational vehicle further comprises a slide out housing that is mounted in the opening in the first side wall, and the slide out housing comprises a plurality of walls. The slide out housing is movable between a retracted position and an extended position. When in the retracted position, the slide out housing is retracted into the opening so as to be substantially positioned within the main housing. When in the extended position, the slide out housing is extended outward from the opening so that a portion of the slide out housing is extended outward from the first side wall. Furthermore, the recreational vehicle comprises a securing mechanism that structurally interconnects the roof of the recreational vehicle to the frame of the recreational vehicle via the walls of the slide out housing.

By structurally interconnecting the slide out walls to the walls of the main housing, the amount of flex of the main housing walls during travel is reduced. This further reduces the likelihood of damage to the wall or associated structures and the loss integrity of the seal between the slide out housing and the main housing. These and other objects and advantages of the present invention will become apparent from the following description taken in conjunction with the accompanying drawings.

DETAILED DESCRIPTION OF THE PREFERRED EMBODIMENTS

Figure 1A:
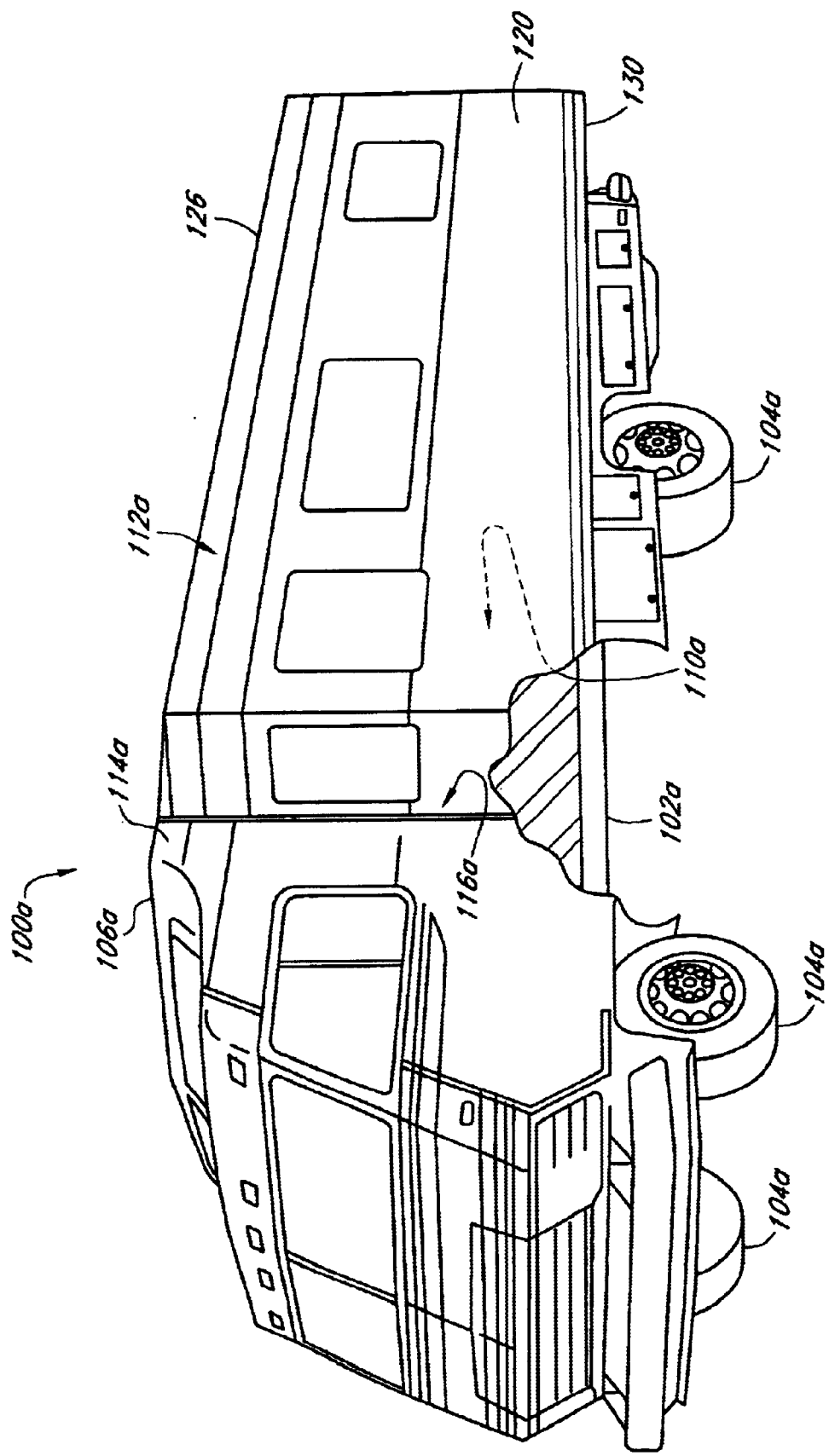
FIG. 1A is a perspective view of a motorhome with a slide out in, the extended live-in position.

References will now be made to the drawings wherein like numerals refer to like parts throughout. FIG. 1A illustrates one embodiment of a recreational vehicle (RV) 100a comprising a motor home having a generally rectangular frame 102a attached to a plurality of wheels 104a so as to permit rolling movement of the RV 100a over the ground. As is also shown in FIG. 1A, a main housing 106a is mounted above the frame 102a and is essentially formed of a plurality of planar walls that are joined together and mounted to the frame 102a in a well known manner so as to define an inner living space 110a having a floor. Furthermore, an exterior slide out assembly 112a is shown attached to a first side wall 114a of the main housing 106a and extended from an opening 116a of the main housing 106a in an extended position.

Figure 1B:
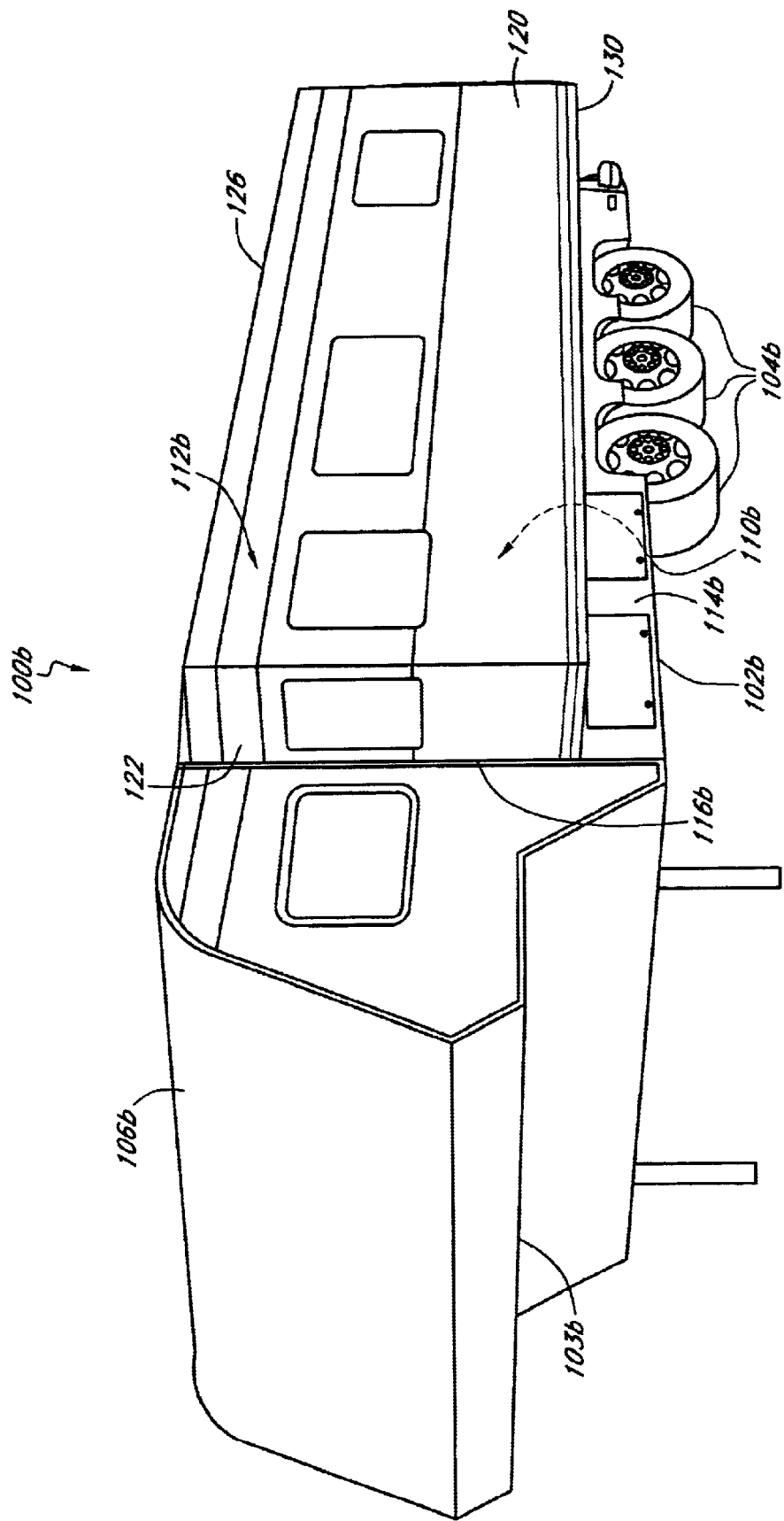
FIG. 1B is a perspective view of a trailer with a slide out in the extended live-in position.

FIG. 1B illustrates another embodiment of a recreational vehicle (RV) 100b comprising a fifth wheel trailer having a generally rectangular frame 102b attached to a plurality of wheels 104b so as to permit rolling movement of the RV 100b over the ground. Furthermore, a male hitch assembly 103b is shown at the front of the RV 100b and is designed to couple with a known female hitch assembly of a towing vehicle so that the RV 100b can be towed by the towing vehicle. As is also shown in FIG. 1B, a main housing 106b is mounted above the frame 102b and is essentially formed of a plurality of planar walls that are joined together and mounted to the frame 102b in a well known manner so as to define an inner living space 110b. Furthermore, an exterior slide out assembly 112b is shown attached to a first side wall 114b of the main housing 106b and extended from an opening 116b of the main housing 106b in an extended position.

As will be described in greater detail below, the exterior slide out assembly 112a, 112b shown respectively in FIGS. 1A and 1B can either be placed in the deployed configuration so as to effectively increase the inner living space 110a, 110b of the RV 100a, 100b or be placed in a retracted configuration so as to provide the RV 100a, 100b with a more suitable size and shape for being driven or towed on a road.

The exterior slide out assembly 112 is formed of a plurality of walls that join together to form a supplemental living space therein. The plurality of walls include an outer vertical wall 120, a front lateral vertical wall 122, a rear lateral vertical wall (not shown), an overhead horizontal wall 126, and a lower horizontal wall 130.

As will be described in detail below, the exterior slide out assembly 112 moves between the extended and the retracted positions in a known manner. Furthermore, although the preferred embodiments shown FIGS. 1A and 1B illustrate the exterior slide out assembly 112 extending from the left side of the RV 100a, 100b, it can be appreciated that the exterior slide out assembly 112 could be adapted to extend from the right side of the RV 100a, 110b.

It will be understood that key elements of the present invention are shared by the motor home RV 100a and the trailer RV 100b. Therefore, for the sake of clarity, the remaining portion of this application will primarily refer to the motor home RV 100a only. However, it is understood that the disclosure applies equally to the trailer RV 110b without departing from the spirit of the invention. Similarly, the remaining portion of this application will refer to the slide out assembly 112 generally as applied to the motor home RV 110a. Again, it is understood that the disclosure applies equally to the trailer RV 110b without departing from the spirit of the invention.

Figure 2A:
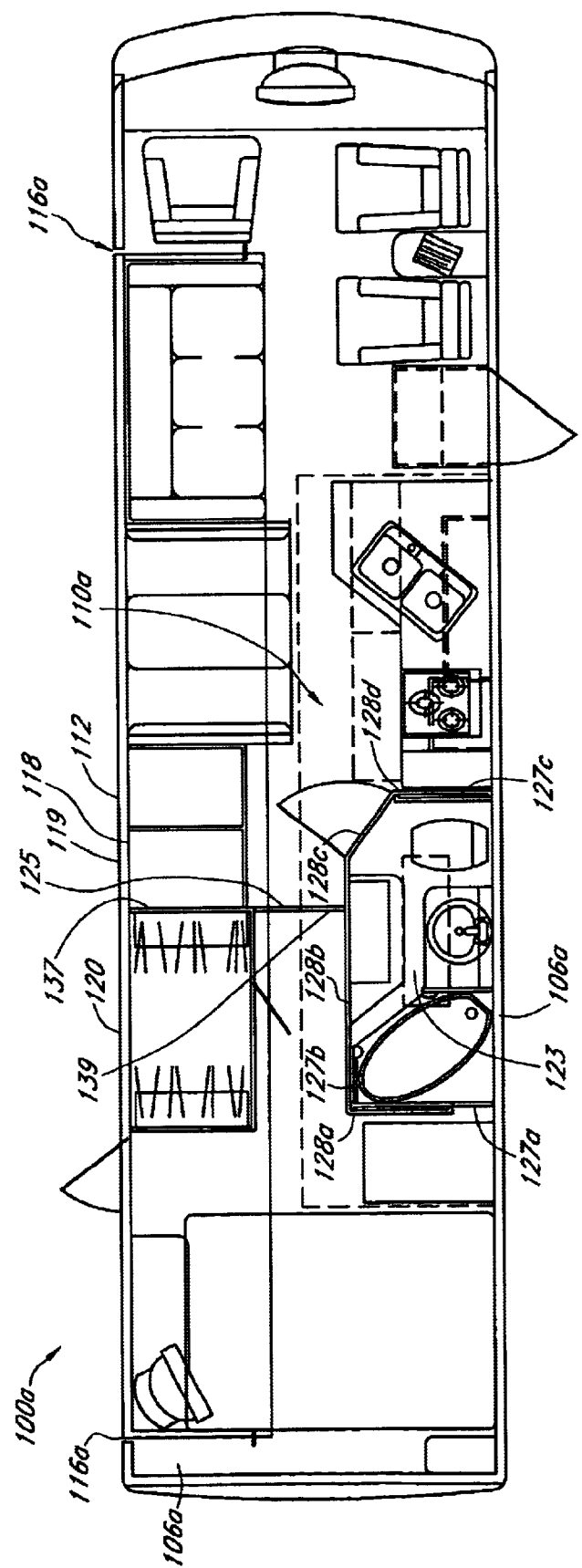
FIG. 2A is a top, cutaway view of a motorhome with a slide out assembly in the retracted travel position.
Figure 2B:
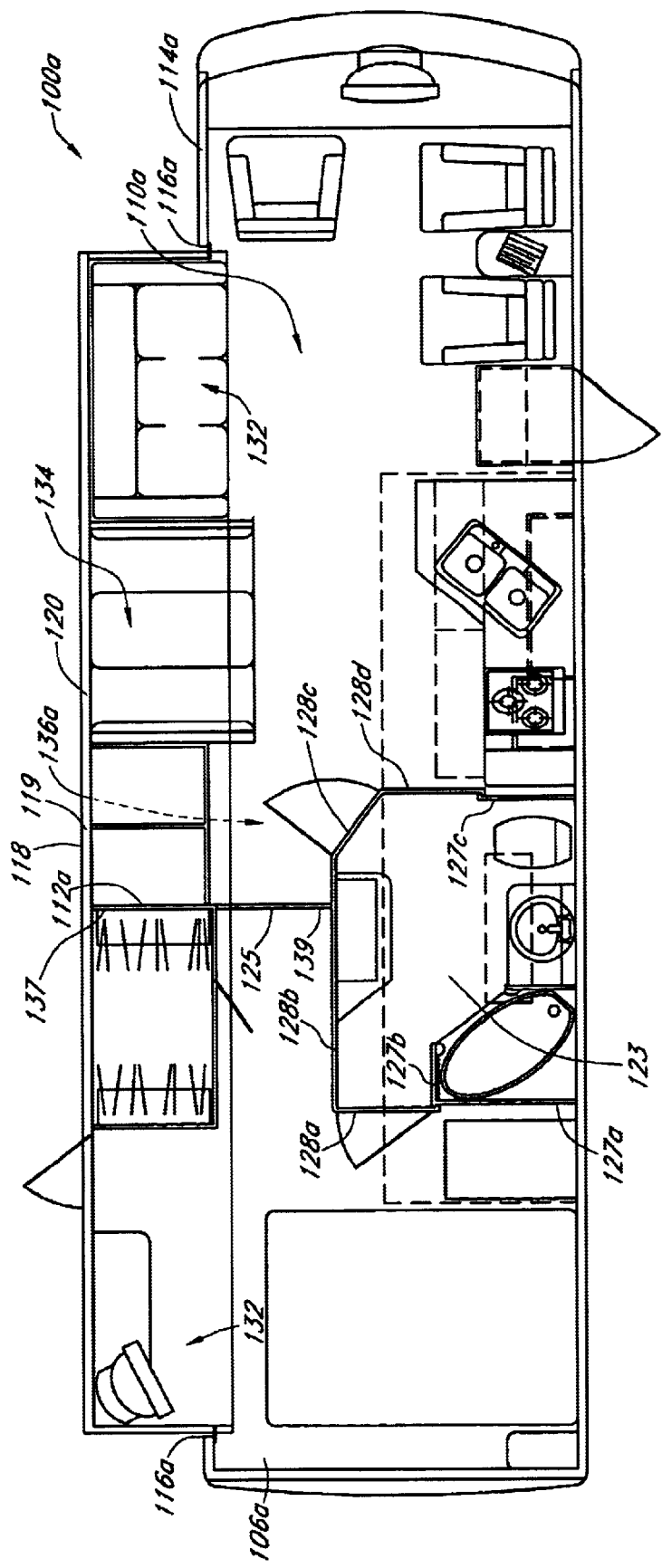
FIG. 2B is a top, cutaway view of a motorhome with a slide out assembly in the extended live-in position.

Reference will now be made to FIGS. 2A and 2B, which provide a detailed plan view of the living space 110a within the motor home 110a of FIG. 1A. In particular, FIG. 2A illustrates the motor home 100a with the exterior slide out assembly 112 in the retracted position and FIG. 2B illustrates the motor home 110a with the exterior slide out assembly 112 in the extended position. It will be appreciated that the layout of the living space 110a illustrated herein is simply illustrative of one of a number of possible layouts and that a number of variations to this layout can be made without departing from the spirit of the present invention.

As shown in FIG. 2A, the exterior slide out assembly 112, in the retracted position, extends into the main housing 106a so that the slide out assembly 112 is substantially positioned within the living space 110a of the RV 100a. Consequently, the outer vertical wall 120 of the exterior slide out assembly 112 is aligned with the opening 116a of the main housing 106a so as to form the RV 100a with a more aerodynamic shape and so as to reduce the effective width of the RV 100a while the vehicle is being driven.

As shown in FIG. 2B, the exterior slide out assembly 112a, in the extended position, extends out of the opening 116a of the first side wall 114a of the main housing 106a so that an opening 132 of the slide out assembly 112 aligns with the opening 116a of the main housing 106a. Thus, the supplemental living space 134 provided by the deployed exterior slide out assembly 112 combines with the living space 110a of the main housing 106a to form an expanded living space 136a of the RV 100a. Although the illustrated embodiment shows the exterior slide out assembly 112 spanning the entire length of the main housing 106a, it can be appreciated that the slide out assembly 112 can be a variety of other suitable lengths, depending on the particular application.

As shown in FIG. 2A and FIG. 2B, the RV 100a includes an internal expandable room 123. In one embodiment, the internal expandable room 123 comprises a plurality of stationary walls 127a–c extending outward from the main housing 106a and a plurality of movable walls 128a–d. Preferably, the internal expandable room 123 also comprises a roof (not shown) that lies only over the internal expandable room 123. The movable walls 128a–d and the roof (not shown) are preferably rigidly attached together. The movable walls 128a–d and the roof are preferably slidably attached to the stationary walls 127a–c. Like the slide out assembly 112 described hereinabove, the internal expandable room 123 can reside either in a retracted or extended position. When in a retracted position, the movable walls 128a–d slide toward the stationary walls 127a–c for space saving purposes. When in an extended position, the movable walls 128a–d slide away from the stationary walls 127a–c in order to increase the living space 110a inside the RV 100a. The roof (not shown) also is expandable such that the internal expandable room 123 will stay completely covered in the extended positions. However, unlike the slide out assembly 112, the internal expandable room 123 lies inside the main housing 106a of the RV 100a regardless of whether the internal expandable room 123 is in the retracted or extended position. As will be described below, a rod 125 connects both the slide out assembly 112 and the internal expandable room 123 such that both can extend and retract in tandem. The entire functional scope and advantages of the internal expandable room 123 is described in detail in Applicant's co-pending patent application Ser. No. 09/595,144 filed on Jun. 16, 2000 and entitled "RECREATIONAL VEHICLES WITH EXPANDABLE ROOM," which is hereby incorporated by reference.

FIG. 2A and FIG. 2B also show that the RV 100a includes a securing mechanism 118. In the embodiment shown, the securing mechanism 118 is located at a midpoint 119 of the slide out assembly 112. As will be described below, the securing mechanism 118 comprises a plurality of subcomponents which allow for the structural interconnection between the slide out assembly 112 and the main housing 106a of the RV 100a both when the slide out assembly 112 is in the extended position and when the slide out assembly 112 is in the retracted position.

Figure 3A:
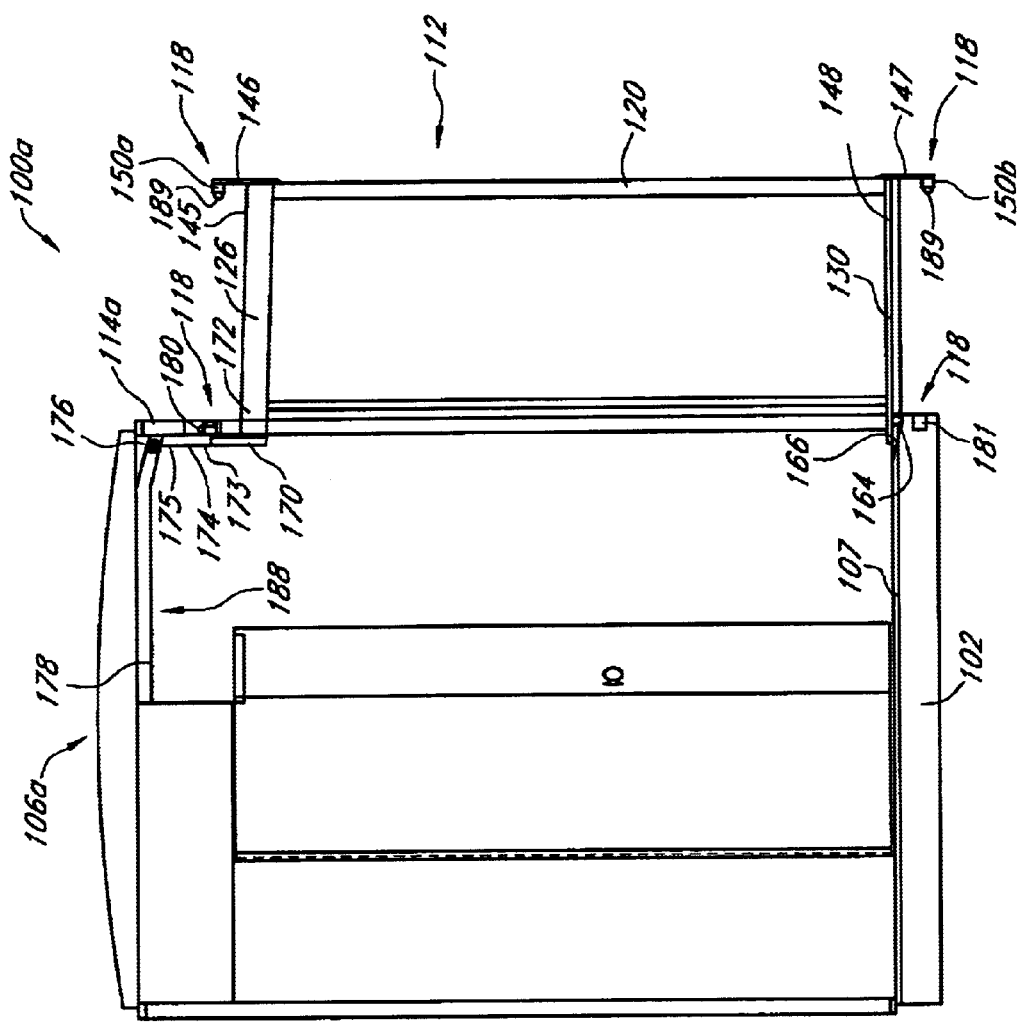
FIG. 3A is a section view of the motorhome with the slide out assembly in the extended live-in position.
Figure 3B:
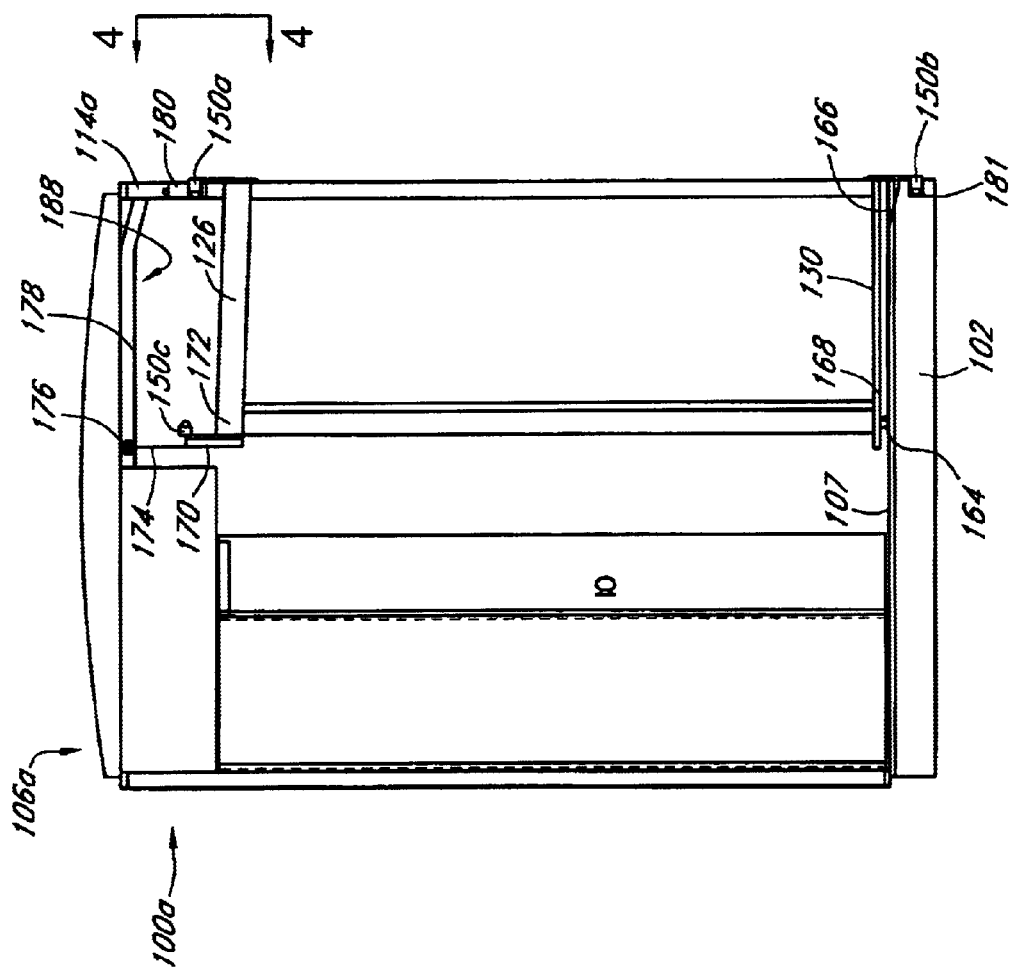
FIG. 3B is a section view of the motorhome with the slide out assembly in the retracted travel position.

Turning now to FIG. 3A and FIG. 3B, cross-sectional views of the RV 100a with the slide out assembly 112 in the extended and retracted positions are shown. As shown in FIG. 3A, the securing mechanism 118 comprises a first upper flange plate 146. In one embodiment, the first upper flange plate 146 is a plate that is rigidly attached to and extends upward from a first end 145 of the upper horizontal wall 126. Similarly, the securing mechanism 118 also comprises a lower flange plate 147. In one embodiment, the lower flange plate 147 is a thin plate that is rigidly attached to and extends downward from a first end 148 of the lower horizontal wall 130. A pin 150a, 150b is attached to the first upper flange plate 146 and the lower flange plate 147 respectively, and both pins 150a, 150b face toward the center of the RV 100a. In one embodiment, the pins 150a, 150b are substantially shaped like cylinders with a conic profile at their first ends 189. As will be described below, the pins 150a, 150b, the first upper flange plate 146 and the lower flange plate 147 structurally interconnect the slide out assembly 112 with the main housing 106a of the RV 100a when the slide out 112 is in the retracted position.

As shown in FIG. 3B, the securing mechanism 118 further comprises a second upper flange plate 170. The second upper flange plate 170 is rigidly attached to and extends upward from a second end 172 of the upper horizontal wall 126. Attached to the second upper flange plate 170 is a pin 150c substantially similar to the other pins 150a, 150b except that it faces in the opposite direction as the others.

Figure 4:
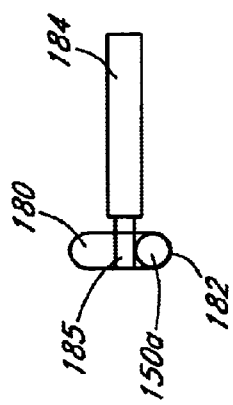
FIG. 4 is a detail view of a slot taken from FIG. 3B.

FIG. 3A and FIG. 3B also illustrate the first side wall 114a of the main housing 106a of the RV 100a having a slot 180. In one embodiment, the slot 180 comprises an oblong shape wherein the slot 180 has a longer length that is positioned in the vertical direction, and the shorter width is positioned in the horizontal direction as is shown in FIG. 4. Preferably, the width of the slot 180 is slightly larger than the diameter of the pins 150a, 150c. Similarly, the depth of the slot 180 is preferably at least equal to the length of the pins 150a, 150c. As will be described in greater detail below, the slide out 112 primarily moves in the horizontal direction; however, the slide out 112 can also move in the vertical direction when it is almost fully extended and when it begins to retract. Thus, the slot 180 is preferably configured to allow for vertical movement of the pins 150a, 150c inside the slot 180.

Moreover, FIG. 3A and FIG. 3B show that the main housing frame 102 further comprises an aperture 181 mounted on a lower section of the main housing frame 102. In one embodiment, the aperture 181 is circular, and the diameter of the aperture 181 is slightly larger than the diameter of the pin 150b. Also, the depth of the aperture 181 is approximately the same as the length of the pin 150b. The aperture is located in the frame 102 so as to be longitudinally aligned with the pin 150b.

As will be described in greater detail below, when the slide out assembly 112 is in the retracted position, one pin 150a resides inside the slot 180 while the other pin 150b resides inside the aperture 181. Similarly, when the slide out assembly 112 is in the extended position, the pin 150c resides inside the slot 180. As will be described in greater detail, positioning the pins 150a–c in such a manner allows the slide out assembly 112 to support the otherwise unsupported first side wall 114a and reduce movement between the upper and lower portions of the first side wall 114a.

FIG. 4 is a detail view of the slot 180. As shown, the pin 150a resides inside a lower end 182 of the slot 180 when the slide out assembly 112 is in the retracted position. In one embodiment, when the slide out assembly 112 has reached the fully retracted position and the pin 150a is positioned at the lower end 182 of the slot 180, a solenoid 184 throws a bolt 185 substantially perpendicular to the major axis of the slot 180. The bolt 185 is sized such that when it is thrown, the periphery of the bolt 185 lies closely adjacent to the upper periphery pin 150a. Thus, in this position, the periphery of the pin 150a is surrounded both by the periphery of the lower end 182 of the slot 180 and by the bolt 185. As will be described below, this feature aids in structurally interconnecting the slide out assembly 112 to the main housing 106a of the RV 100a.

Similarly, when the slide out assembly 112 is in the extended position, the pin 150c resides inside the slot 180. The bolt 185 of the solenoid 184 then shifts into position above the pin 150c such that the bolt 185 in combination with the periphery of the slot 180 retains the pin 150c. As will be described below, this increases the structural integrity of the RV 100a.

In another embodiment, the solenoid 184 automatically shifts the bolt 185 into position. A controller (not shown) sends an electronic signal to the solenoid 184 when the slide out assembly 112 reaches its fully extended or fully retracted position. The solenoid 184 then shifts the bolt 185 into position over the pins 150a, 150c.

Referring back to FIGS. 2A and 2B, the retaining structures 118, in this embodiment, are located at the midpoint 119 of the slide out assembly 112. In the embodiment shown in FIGS. 2A and 2B, the retaining structure 118 supports the midpoint 119 of the slide out assembly 112 to support the otherwise unsupported midpoint 119 of the first side wall 114a. As such, the loss in stiffness of the first side wall 114a caused by the removal of material to make the opening 116 is counteracted by the support given by the retaining structure 118. It will, however, be appreciated that while the retaining structures are shown as being mounted at the mid-points, any number of retaining structures positioned about the interface between the slide out and the main housing can be implemented without departing from the spirit of the present invention.

More specifically, it is understood that once the opening 116 is formed (i.e., when material is removed from the first side wall 114a to form the opening 116), structural support is lost from the first side wall 114a. As such, the portions of the first side wall 114a at the periphery of the opening 116 have a greater ability to flex and bend toward/out from the middle of the opening. However, the securing mechanism 118 restores some of the structural support into the first side wall 114a. When the slide out assembly 112 is in the retracted position, forces in the first side wall 114a transfer into the pins 150a, 150b and into the walls of the slide out assembly 112. Because the walls of the slide out assembly 112 are rigid, the walls counteract those forces and cause the pins 150a, 150b to push opposite to the direction of flexure (i.e., support the periphery of the opening 116) such that flexure is reduced. Similarly, when the slide out assembly 112 is in the extended position, forces in the first side wall 114a transfer into the pin 150c and into the walls of the slide out assembly 112. Because the walls of the slide out assembly 112 are rigid, the walls counteract those forces and cause the pin 150c to push opposite to the direction of flexure (i.e., support the periphery of the opening 116) such that flexure is reduced.

Reduction in flexure allows for several advantages. First, the walls of the main housing 106 are less likely to deform due to flexure, and there is less likelihood for damage to the walls or for damage to components that attach to the wall (e.g., cabinets, surface treatments, etc). Additionally, the interfacing members between the main housing 106 and the slide out assembly 112 are less likely to make contact and deform due to flexure, and thus any seals or other like members are more likely to remain functional and watertight. Finally, noisy vibrations between the first side wall 114a and the slide out assembly 112 are likely to be advantageously reduced. This is because the portions of the first side wall 114a around the periphery of the opening 116 are less likely to flex and make contact with the slide out assembly 112.

It is understood that as slide out assemblies 112 become larger, the opening 116 becomes larger, there becomes more unsupported length of the first side wall 114, and the amount of potential flexure of the first side wall 114 increases. As stated, use of the securing mechanism 118 counteracts the loss of support in the first side wall 114 and there is less potential for flexure even though the opening 116 is larger. Therefore, the securing mechanism 118 advantageously allows RV manufacturers to incorporate larger slide out assemblies 112 into their RVs. Advantageously, the usable living space inside the RV 100a can be increased with the larger slide out assembly 112.

In other embodiments, a plurality of securing mechanisms 118 are integrated into the RV 100a. For instance, in one particular embodiment, there are securing mechanisms 118 located at each of the four corners of the slide out assembly 112. In other embodiments, multiple securing mechanisms 118 are positioned intermittently along the length of the overhead horizontal wall 126 and the lower horizontal wall 130 of the slide out assembly 112. It is understood that as the number of securing mechanisms 118 increases, there are more locations where the first side wall 114a is supported, and there is advantageously less flexure of the first side wall 114a.

FIG. 3A and FIG. 3B also show components that help to move the slide out assembly 112 between the extended and retracted positions. The slide out assembly 112 moves between its retracted position and its extended position in a known manner. In one embodiment, a motor (not shown) engages an actuator (not shown), such as a worm gear or screw drive, and the actuator moves the slide out assembly 112 between its extended and retracted position. In other embodiments, hydraulic components are used to move the slide out assembly 112 and in still other embodiments, the slide out assembly 112 is moved manually. It is understood that movement of the slide out assembly 112 could be achieved in numerous ways without departing from the spirit of the invention.

FIG. 3A and FIG. 3B also show components that aid in the movement of the slide out assembly 112. As shown, a roller 164 is attached to the underside of a second end 168 of the lower horizontal wall 130 of the slide out assembly 112 to allow for rolling movement of the slide out assembly 112 across a floor 107 of the main housing 106a of the RV 100a. More specifically, when the slide out assembly 112 is in the retracted position, the lower horizontal wall 130 of the slide out assembly 112 rests above the floor 107 of the RV 100a. Then, as the slide out assembly 112 moves between the retracted position and the extended position, the roller 164 rolls down a ramp 166 cut into the floor 107 of the RV 100a. As shown in FIG. 3A, once the slide out assembly 112 reaches its fully extended position, the lower horizontal wall 130 lies flush with the floor 107 of the RV 100a.

Also, as shown in FIG. 3A and FIG. 3B, the slide out assembly 112 also comprises a roller system 188 which supports the second end 172 of the overhead horizontal wall 126 as the slide out assembly 112 moves. The roller system 188 comprises a post 174, which has a first end 173 and a second end 175. The first end 173 of the post 174 is rigidly attached to the second upper flange plate 170. A roller 176 is connected to the second end 175 of the post 174. The roller 176 lies inside a track 178. The track 178 is rigidly attached to the main housing 106a of the RV 100a. In one embodiment, the track 178 comprises a long piece of bent metal, and its cross section resembles the letter "C." In the embodiment shown in FIG. 3B, the track 178 is substantially straight except that, at a first end 180 of the track 178, the track 178 is bent at substantially the same angle as the ramp 166 included in the floor 107 of the RV 100a. When the roller 178 approaches the first end 180 of the track 178, the roller 178 moves in a downward angle in the same direction as the roller 164 located at the second end 168 of the lower horizontal wall 130.

When the slide out assembly 112 moves, the roller 176 moves along the track 178. As such, the roller 176 in turn supports the second end 172 of the overhead horizontal wall 126 of the slide out assembly 112 via the post 174. Thus, the weight of the slide out assembly 112 is distributed between the roller 164 at the bottom of the slide out assembly 112 and the roller 176 located in the track 178. Advantageously, the slide out assembly 112 is easier to move because the distribution of weight puts less normal force on each roller 164, 176, thereby reducing the resultant frictional force at the rollers 164, 176.

On a related note, since the roller 176 is guided by the track 178 and is unlikely to come out of the track 178, the slide out assembly 112 is more likely to slide out straight. Advantageously, the potential for damaging the interface between the slide out assembly 112 and the main housing 106a due to a lateral shift of the slide out assembly 112 is reduced.

It is understood that the roller systems 188 are designed to provide support sufficient enough to move the slide out assembly 112 from a retracted position to an extended position and vice versa. However, the roller systems 188 are not primarily designed to provide structural integrity between the main housing 106a of the RV 100a and the slide out assembly 112. Instead, the securing mechanism 118 acts as a dedicated load-bearing device, taking the load off of the roller system 188. Advantageously, the roller system 188 is less likely to deform or malfunction due to excessive loading.

Figure 5A:
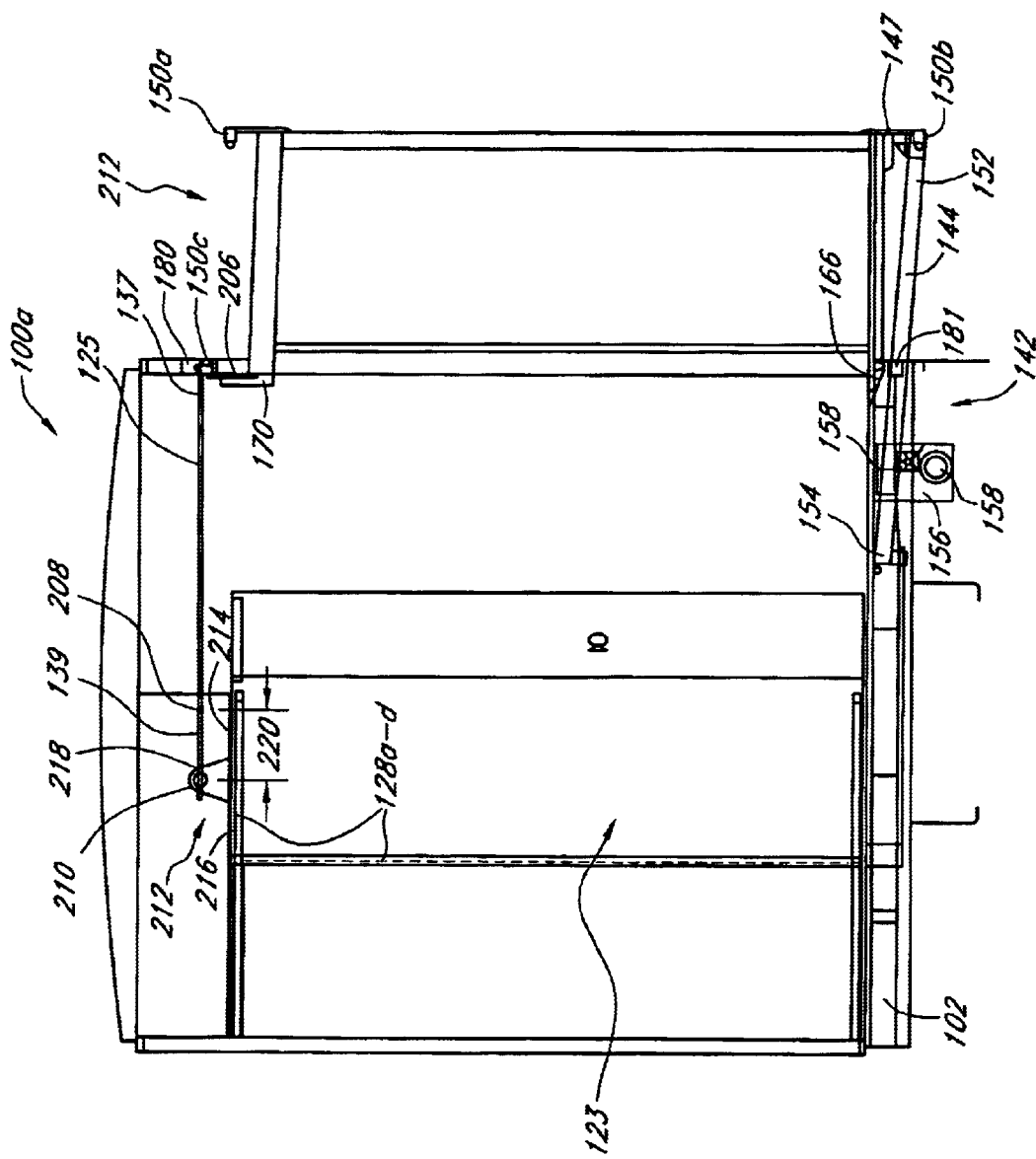
FIG. 5A is a section view of a coach of an alternative embodiment of the actuating mechanism of the slide out assembly.
Figure 5B:
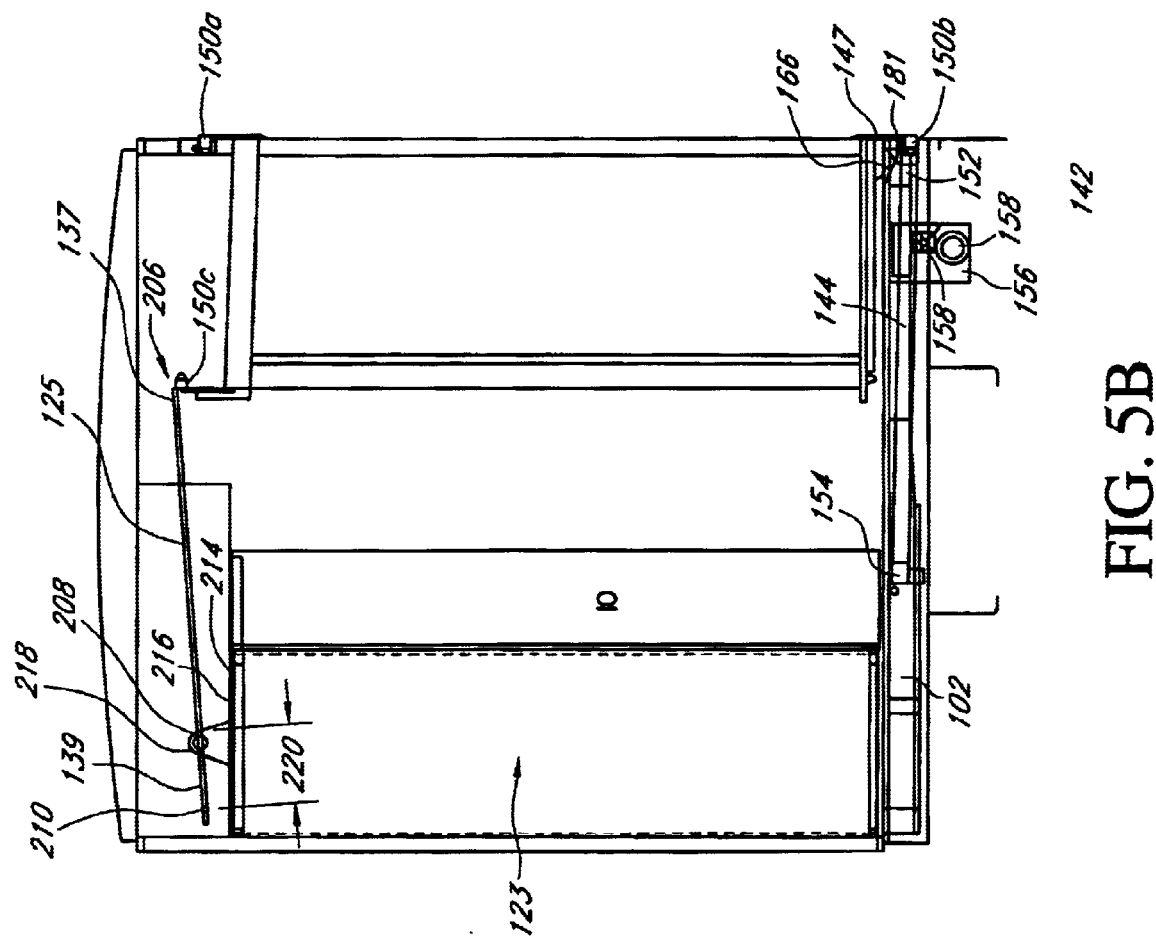
FIG. 5B is a section view of a coach with an alternative embodiment of the actuating mechanism of the slide out assembly.

Turning now to FIG. 5A and FIG. 5B, another embodiment of the RV 100a with the slide out assembly 112 in the extended and retracted position is shown. In this embodiment, a different system is used to move the slide out assembly 112 between the retracted and extended positions.

More specifically, a slider assembly 142 allows the slide out assembly 112 to extend or retract. The slider assembly 142 comprises a pivot beam 144 including a first end 152, which is pivotally attached to the lower flange plate 147, and a second end 154, which is pivotally and slidably attached to the frame 102 of the RV 100a.

The slider assembly 142 further comprises a motor 156, which generates mechanical motion. In the embodiment shown, when the motor 156 is turned on, the motor 156 engages a plurality of gears 158, and at least one of the plurality gears 158 engages with the pivot beam 144 to shift the pivot beam 144 substantially horizontal with respect to the motor 156. In this embodiment, the movement causes the pivot beam 144 to pivot about its second end 154 because the gears 158 of the motor 156 remain stationary and push upward on the pivot beam 144 as the pivot beam 144 slides.

As the pivot beam 144 slides, the pins 150a, 150b align with their respective slots 180, 181 (in the case of retraction of the slide out 112) and the pin 150c aligns with its respective slot 180 (in the case of extension of the slide out 112).

It is understood that the slider assembly 142 is designed to provide support sufficient enough to move the slide out assembly 112 from a retracted position to an extended position and vice versa. However, the slider assembly is not primarily designed to provide structural integrity between the main housing 106a of the RV 100a and the slide out assembly 112. Instead, the securing mechanism 118 acts as a dedicated load-bearing device, taking the load off of the slider assembly 142. Advantageously, the slider assembly 142 is less likely to deform or malfunction due to excessive loading.

As stated previously, in one embodiment, the slide out assembly 112 is attached to the internal expandable room 123 via the rod 125. As such, when the slide out assembly 112 moves into its retracted or extended position, the movable walls 128a–d of the internal expandable room 123 move with the slide out assembly 112.

As FIGS. 5A and 5B illustrate, a second end 139 of the rod 125 is pivotally attached to a mounting bracket 212 formed on the upper surface 214 of an overhead covering 216 of the internal expandable room 123. In particular, the second end 139 of the rod 125 is inserted through an opening 218 formed on the mounting bracket 212. Furthermore, the diameter of the opening 218 is preferably sized to permit the rod 125 limited horizontal and vertical movements. Preferably, a first stop 208 and a second stop 210 are positioned near the second end 139 of the rod 125 to inhibit the first end 204 of the rod 125 from sliding out of the opening 218 while moving horizontally and to facilitate movement of the movable walls 128a–d of the internal expandable room 123.

As is also shown in FIGS. 5A and 5B, a first end 137 of the rod 125, comprises an L-section 206. In one embodiment, the L-section 206 is an approximately ninety-degree bend in the rod 125. The L-section 206 is rigidly attached to the second upper flange plate 170 of the slide out assembly 112. Also, the pin 150c is rigidly attached to the L-section 206 at a position in which the pin 150c can lie inside the slot 180 when the slide out assembly 112 is in the extended position.

Preferably, the rod 125 is mounted in a manner such that outward movements of the slide out assembly 112 will exert a force on the rod 125, causing the rod 125 to move in a substantially horizontal direction. During deployment of the slide out assembly 112, the rod 125 is pulled outward by the slide out assembly 112 causing the second end 139 of the rod 125 to slide in generally the same direction through the opening 218 on the mounting bracket 212 until the first stop 208 of the rod 125 is adjacent the opening 218.

Preferably, the second stop 210 is larger than the opening 218, causing the rod 125 to stop sliding once it is adjacent the opening 218. As such, a continued pulling of the rod 125 by the slide out assembly 112 will cause the second stop 210 to push against the mounting bracket 212 in an outward direction. Since the mounting bracket 212 is fixedly mounted to the overhead covering 216 of the internal expandable room 123, the outward push exerted on the mounting bracket 212 by second stop 210 will deploy the movable walls 128a–d.

In one embodiment, the first and second stop 208, 210 can be adjusted and spaced apart at a desired distance. As stated previously, the internal expandable room 123 will extend when the second stop 210 lies adjacent to the mounting bracket 212, and the internal expandable room 123 will retract when the first stop 208 lies adjacent to the mounting bracket 212. However, the movable walls 128a–d of the internal expandable room 123 will remain stationary when the mounting bracket 212 lies in between the stops 208, 210. This allows the rod 125 to slide freely through the opening 218 for a first distance 220 (i.e., the first distance 220 equal to the distance between the first and second stop 208, 210). This allows the slide out assembly 112 to move independently from the internal expandable room 123 until one of the stops 208, 210 contacts the mounting bracket 212. Advantageously, if the slide out assembly 112 requires more travel than the internal expandable room 123 to move between an extended position or a retracted position, this type of movement is possible due to the adjustable first and second stops 208, 210.

As stated, this embodiment includes a slider assembly 142, which causes the slide out assembly 112 a certain amount of vertical movement when the slide out assembly 112 moves from a retracted position to an extended position. Conversely, the slide out assembly 112 moves vertically upward when the slide out assembly 112 moves from an extended position to a retracted position.

Because of this vertical movement of the slide out assembly 112, it is necessary for the rod 125 to be able to pivot as the slide out assembly 112 moves vertically or else the rod 125 will bend, permanently deform, or fracture. In one embodiment, the mounting bracket 212 allows the rod 125 to pivot. In one embodiment, the size of the opening 218 is large enough relative to the diameter of the rod 125 such that the rod 125 can pivot over its required range freely. In another embodiment, the rod 125 is allowed to pivot because the opening 218 of the mounting bracket 212 is defined by a flange (not shown), and the flange is attached to the remaining portion of the mounting bracket 212 by way of a roller bearing widely known in the art to allow for rotating motion while it remains fixed inside an outer structure.

As stated above, the entire functional scope and advantages of the internal expandable room 123 is described in detail in Applicant's co-pending patent application Ser. No. 09/595,144 filed on Jun. 16, 2000 and entitled "RECREATIONAL VEHICLES WITH EXPANDABLE ROOM," which is hereby incorporated by reference.

Although the preferred embodiment of the present invention has shown, described and pointed out the fundamental novel features of the invention as applied to this embodiment, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appended claims.

What is claimed is:

1. A recreational vehicle comprising:
   a chassis having first and second ends and first and second lateral sides;
   a set of wheels attached to the chassis to permit rolling movement over the ground;
   a main housing having a floor positioned on the chassis, first and second, side walls and first and second end walls and a roof mounted atop the first side wall, the second side wall, the first end wall and the second end wall so, as to define an interior living space, wherein the first side wall defines an opening therein that extends a lateral, distance in the first side wall and a vertical distance such that the opening in the first side wall defines an upper portion and lower portion of the first-side wall;

a slide out housing that is mounted in the opening in the first side wall, wherein the slide out housing is movable between a retracted position wherein the slide out housing is retracted into the opening so as to be substantially positioned within the main housing and an extended position wherein the slide out housings extended outward from the opening so that a portion of the slide out housing is extended outward from the, first side wall; and securing mechanism that engages with the slide out housing and the upper, portion and the lower portion of the first side wall such that the securing mechanism, in combination with the slide out housing, inhibits movement between the upper portion of the first side wall and the lower portion of the first side wall of the main housing when the slide out housing is in the retracted position wherein the securing mechanism comprises first and second securing members and first and second receptacles that receive the first and second securing members and wherein the first and second securing members and the first and second receptacles are positioned adjacent the upper and lower edges of the slide out housing-and wherein the first and second securing members extend in a direction substantially perpendicular to the first and second side walls.

2. The recreational vehicle of claim 1, wherein the recreational vehicle comprises a trailer.

3. The recreational vehicle of claim 1, wherein the recreational vehicle comprises a motor home.

4. The recreational vehicle of claim 1, wherein the securing mechanism comprises at least one receptacle formed in the upper portion of the first side wall and at least one receptacle formed in the lower portion of the first side wall and at least one, securing member mounted to the slide out housing that is positioned within the at least one receptacle in the upper portion of the first side wall and at least one securing member mounted to the slide out housing that is positioned within the at least one receptacle in the lower portion of the first side wall when the slide out housing is in the retracted position such that the slide out housing is structurally interconnected to the upper and lower portions of the first side wall so that the slide out housing inhibits movement between the upper portion of the first side wall and the lower portion of the first side wall.

5. The recreational vehicle:of claim 4, wherein the securing mechanism engages with the slide out housing and the upper and lower portions of the first side wall such that the securing mechanism, in combination with the slide out housing, inhibits movement between the upper portion of the first side wall,and the lower portion of the first side wall of the main housing when the slide out housing is in the extended position.

6. The recreational vehicle of claim 5, wherein the securing mechanism comprises at least one receptacle formed in the upper portion of the first side wail and at least one securing member mounted to the slide out housing that is positioned within the at least one receptacle when the slide out housing is in the extended position such that the slide out housing is structurally interconnected to the upper portion of the first side wall so that the slide out housing helps to maintain the upper portion of the first side wall at a selected distance from the lower portion of the first side wall.

7. The recreational vehicle of claim 1, wherein the securing mechanism comprises first and second receptacles formed in upper and lower portions of the first side wall of the main housing and first and second securing members that are mounted to the slide out housing so as to be positionable within the first and second receptacles in the retracted position.

8. The recreational vehicle of claim 7, wherein the securing member comprises a cylindrically shaped post and wherein the at least one receptacle defines an elongated slot having horizontal and vertical dimensions and wherein the horizontal dimension is selected so as to restrict the horizontal movement of the securing member once positioned inside the receptacle.

9. The recreational vehicle of claim 8, further comprising a bolt mounted adjacent the receptacle and adapted to extend horizontally and generally perpendicular to the axis of the cylindrical post into the elongated slot thereby reducing the vertical dimension of the elongated slot so as to limit the vertical movement of the securing, member positioned within the receptacle.

10. The recreational vehicle of claim 7, wherein the securing mechanism is located proximate a midpoint of the slide out housing along a direction extending between the first and second ends of the chassis.

11. A recreational vehicle comprising:

a frame having first and second ends and first and second lateral sides;

a plurality of wheels attached to the frame so as to permit rolling movement of the frame over the ground;

a main housing having a floor positioned on the frame, first and second side walls and first and second end walls and a roof mounted atop the first side wall, the second side wall, the first end wall, and the second end wall so as to define an interior living space, wherein the first side wall defines an opening therein that extends a lateral distance in the first side wall and a vertical distance such that the opening in the first side wall defines an upper portion and a lower portion of the first side wall;

a slide out housing that is mounted in the opening in the first side wall, wherein the slide out housing comprises a plurality of walls, wherein the slide out housing is movable between a retracted position wherein the slide out housing is retracted into the opening so as to be substantially positioned within the main housing and an extended position wherein the slide out housing is extended outward from the opening so that a portion of the slide out housing is extended outward from the first side wall; and a securing mechanism that structurally interconnects the upper portion of the first side wall of the recreational vehicle to the frame of the recreational vehicle via the walls of the slide out housing, wherein the securing mechanism comprises a first securing component mounted on the upper portion of the first side wall and a second securing component mounted on the slide out assembly such that the second securing component engages with the first securing component when the slide out housing is in the retracted position.

12. The recreational vehicle of claim 11 wherein the first securing component is mounted on the upper portion of the first side wall so as to receive the second securing component which is mounted on the slide out assembly such that the second securing component engages with the first securing component in a substantially perpendicular manner when the slide out housing is in the retracted position.

13. The recreational vehicle of claim 12, wherein the first securing component comprises a receptacle and the second securing component comprises a member that is positionable within the receptacle when the slide out is in the retracted position to thereby structurally interconnect the upper portion of the first side wall of the recreational vehicle to the frame of the recreational vehicle via the walls of the slide out housing.

14. The recreational vehicle of claim 11, further comprising third and fourth securing components mounted on the lower portion of the first side wall and the lower portion of the slide out housing respectively such that the fourth securing component engages with the third securing component when the slide out housing is in the retracted position.

15. The recreational vehicle of claim 14, wherein the third securing component comprises a receptacle and the fourth securing component comprises a member that is positionable within the receptacle when the slide out housing is in the retracted position to thereby structurally interconnect the lower portion of the first side wall of the recreational vehicle to the frame of the recreational vehicle via the walls of the slide out housing.

16. The recreational vehicle of claim 12, further comprising a fifth securing component mounted on the slide out housing that engages with the first securing component so as to structurally interconnect the slide out housing with the upper portion of the first side wall when the slide out housing is in the extended position.

17. The recreational vehicle of claim 10, wherein the recreational vehicle comprises a trailer.

18. The recreational vehicle of claim 10, wherein the recreational vehicle comprises a motorhome.

* * * * *